(12) United States Patent
Jaffery (10) Patent No.: US 8,479,243 B2
(45) Date of Patent: Jul. 2, 2013

(54) SYSTEM AND METHOD FOR MANAGING SERVICES ON AN INTERNET PROTOCOL TELEVISION SYSTEM

(75) Inventor: Qudsia Jaffery, Irving, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 492 days.

(21) Appl. No.: 12/629,257

(22) Filed: Dec. 2, 2009

(65) Prior Publication Data

US 2011/0131611 A1    Jun. 2, 2011

(51) Int. Cl.
*H04N 7/173* (2011.01)
*G06F 3/00* (2006.01)

(52) U.S. Cl.
USPC .................. 725/109; 725/51; 725/54

(58) Field of Classification Search
None
See application file for complete search history.

(56) References Cited

U.S. PATENT DOCUMENTS

| | | | |
|---|---|---|---|
| 6,311,186 B1 | 10/2001 | MeLampy et al. | |
| 7,010,804 B2 | 3/2006 | Shintani et al. | |
| 7,085,287 B1 | 8/2006 | Chapman | |
| 7,349,430 B1 | 3/2008 | Chapman | |
| 7,523,476 B2 | 4/2009 | Tsukamoto et al. | |
| 2005/0086693 A1* | 4/2005 | Shintani | 725/54 |
| 2009/0150933 A1 | 6/2009 | Lee et al. | |
| 2009/0158327 A1 | 6/2009 | Song et al. | |
| 2009/0158349 A1* | 6/2009 | Song et al. | 725/54 |
| 2009/0165050 A1 | 6/2009 | Lee et al. | |

\* cited by examiner

*Primary Examiner* — Brian T Pendleton
*Assistant Examiner* — Jean D Saint Cyr
(74) *Attorney, Agent, or Firm* — Guntin & Gust, PLC; Douglas Schnabel (57) ABSTRACT

A service management system for an IPTV network includes a comparison module that provides a list of differences between a channel map and a change manifest, an optimizer module that receives the list and provides another IPTV channel map based on the differences, and a storage module that provides the first IPTV channel map to the comparison module and stores the second list and the second IPTV channel map. A method includes comparing a channel map with a change manifest in a comparison module, providing a list of differences between the channel map and the change manifest, evaluating the list to provide another list of services and another channel map, and storing the second list and the second channel map.

20 Claims, 4 Drawing Sheets

SYSTEM AND METHOD FOR MANAGING SERVICES ON AN INTERNET PROTOCOL TELEVISION SYSTEM

FIELD OF THE DISCLOSURE

The present disclosure generally relates to an Internet protocol television system, and more particularly relates to advertising content on an Internet protocol television system.

BACKGROUND

An Internet protocol television (IPTV) service provider can transmit an IPTV signal to a user of the IPTV system via a central office, a serving area interface, and a residential gateway. The IPTV service provider can offer the user a variety of different content and services. For example, the IPTV service provider can supply users with real-time television programs that are typically available for the users to watch only at a specific date and time. The IPTV service providers can also offer the users on-demand movies that are available for an extended amount of time and that are provided to the users upon request of the on-demand movie. The user can also record audio or video content for storage in a digital format on the user's set-top box or on a data server on the IPTV system. The operator of the IPTV system provides the content and services on different channels that are accessed by the user's set-top box.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods or computer-readable media. Moreover, some statements may apply to some inventive features but not to others.

Figure 1:
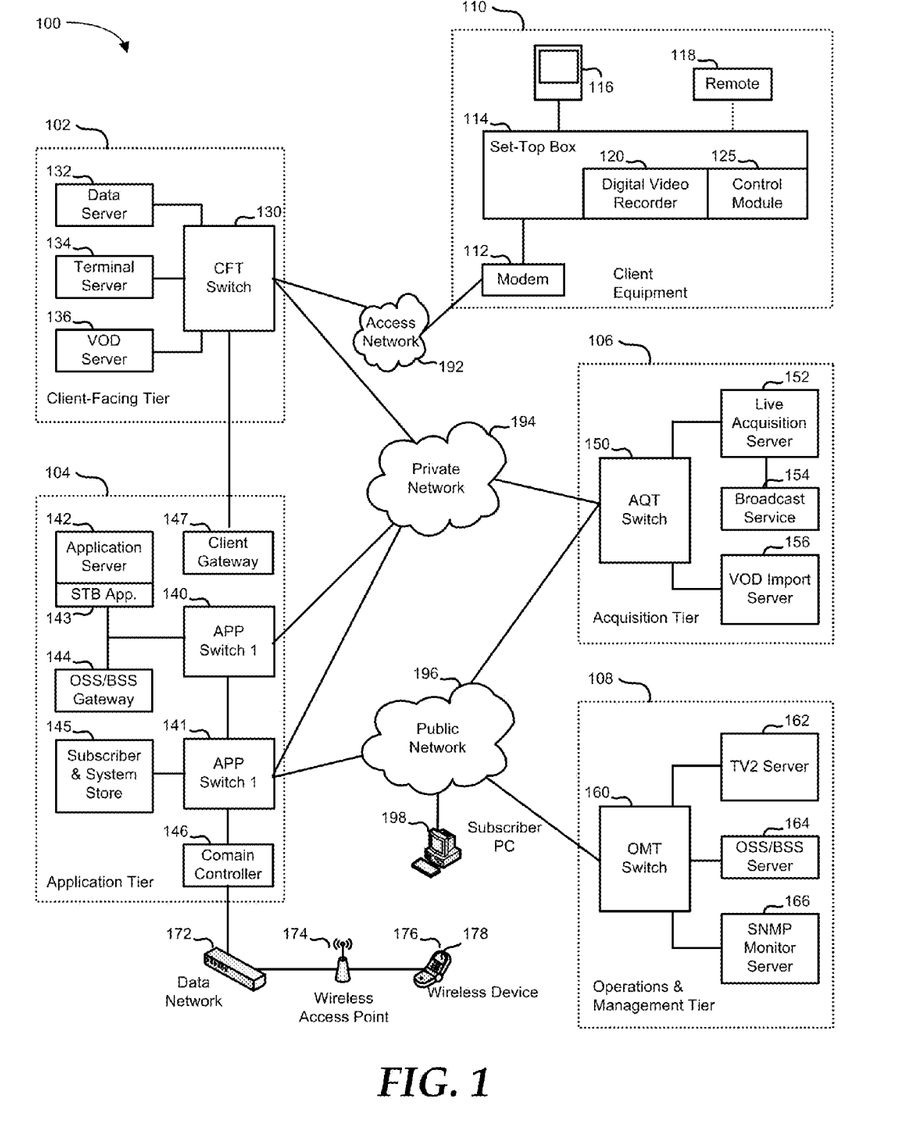
FIG. 1 is a block diagram illustrating an embodiment of an IPTV network.

FIG. 1 shows an embodiment of an IPTV system 100 including a client facing (CF) tier 102, an application tier 104, an acquisition tier 106, an operations and management (OM) tier 108, and one or more sets of client equipment 110. Client equipment 110 is typically located at the home or business premises of a subscriber to the IPTV system 100. IPTV system 100 includes an access network 192, a private network 194, and a public network 196. Each tier 102, 104, 106, and 108 is coupled to one or more of access network 192, private network 194, and public network 196. In an embodiment, CF tier 102 is coupled to access network 192 and to private network 194, application tier 104 is coupled to private network 194 and to public network 196, acquisition tier 106 is coupled to private network 194 and to public network 196, and OM tier 108 is coupled to public network 196. Client equipment 110 is coupled to access network 192.

Networks 192, 194 and 196 communicate information between tiers 102, 104, 106, and 108, and client equipment 110. Access network 192 communicates information between CF tier 102 and client equipment 110. Private network 194 communicates information between CF tier 102 and application tier 104, between application tier 104 and acquisition tier 106, and between acquisition tier 106 and CF tier 102. Public network 196 communicates information between application tier 104 and acquisition tier 106, between acquisition tier 106 and OM tier 108, and between OM tier 108 and application tier 104. Information is also communicated directly between CF tier 102 and application tier 104, as described below. The information communicated between tiers 102, 104, 106, and 108, and client equipment 110 includes encoded television programs, audio files, data files, commands, procedures, other information, or any combination thereof.

CF tier 102 communicates with multiple sets of client equipment 110 over a wide geographic area, such as a regional area, a metropolitan area, a viewing area, or any other suitable geographic area that is supported by access network 192. Client equipment 110 includes a modem 112, a set-top box 114, a display device 116, and a remote control 118. The set-top box 114 includes a digital video recorder (DVR) 120 and a control module 125. Modem 112 is coupled to access network 192, and translates information from a form suitable for transmission over access network 192 to a form suitable for use by set-top box 114, and vice versa. In a non-limiting example, modem 112 is coupled to access network 192 via fiber-optic cables, a digital subscriber line (DSL), another network fabric, or any combination thereof.

The information that CF tier 102 communicates to modem 112 is sent to set-top box 114, which processes the information into a form suitable for display by display device 116 or for recording by DVR 120. Set-top box 114 receives digitally encoded content from CF tier 102 for display on display device 116, or for recording by DVR 120. Set-top box 114 can also receive data from CF tier 102, and render or display the data on display device 116. Further, set-top box 114 can send data to CF tier 102. Such data can include service requests, or commands from the subscriber, received by set-top box 112 via remote control 118. In this way, the subscriber can request services or information or respond to a request for information from IPTV system 100. Control module 125 includes instructions that are executable by set-top box 114 to control the data flow between the subscriber and IPTV system 100. Control module 125 can include an IPTV software platform such as Microsoft® TV IPTV Edition.

Control module 125 can facilitate data communication between set-top box 114 and IPTV system 100. For example, control module 125 can include a procedure whereby set-top box 114 receives a request to record content on DVR 120, or sends a status to IPTV system 100 that the content has been recorded. Likewise, control module 125 can include a procedure whereby the subscriber can interact with IPTV system 100 to receive and execute a viewing preference that the subscriber has created in IPTV system 100. Such preferences can be created via remote control 118, or through a subscriber account that is accessible through public network 196, such as through a subscriber's personal computer 198. A non-limiting example of remote control 118 includes a hand-held controller device, a game controller device, a keyboard/mouse device, another control device, or any combination thereof.

CF tier 102 includes a client-facing tier (CFT) switch 130, a data server 132, a terminal server 134, and a video-on-demand (VOD) server 136. CFT switch 130 manages communication with client equipment 110 through access network 192 and with application tier 104 and acquisition tier 106 through private network 194. CFT switch 130 is coupled to data server 132 that stores data transmitted in response to subscriber requests. CFT switch 130 is also coupled to terminal server 134 that provides terminal devices, such as a game application server, or other devices with a common connection point to private network 194. CFT switch 130 is also coupled to VOD server 136.

Application tier 104 includes application tier (APP) switches 140 and 141, an application server 142, an operation systems and support/billing systems and support (OSS/BSS) server 144, a subscriber and system store 145, a domain controller 146, and a client gateway 147. APP switches 140 and 141 manage communication with CF tier 102 and acquisition tier 106 through private network 194. APP switch 141 also manages communication with acquisition tier 106 and OM tier 108 through public network 196. APP switch 140 is coupled to APP switch 141. APP switch 140 is also coupled to application server 142 and to OSS/BSS gateway 144. Application server 142 provides applications to set-top box 114 through a set-top box application 143, so that set-top box 114 can provide functions such as recording and displaying content, messaging, and processing of IPTV data and VOD material. OSS/BSS gateway 144 includes operation systems and support (OSS) data, and billing systems and support (BSS) data.

APP switch 141 is coupled to domain controller 146 and to subscriber and system store 145. Domain controller 146 provides web access, for example, to subscribers via public network 196. Subscriber and system store 145 includes account information that is associated with subscribers who access IPTV system 100 via private network 194 or public network 196. Application tier 104 also communicates data directly to CF tier 102 through client gateway 147. In this embodiment, client gateway 147 is coupled directly to CFT switch 130.

Client gateway 147 provides subscriber access to private network 194 and tiers coupled thereto. In particular, set-top box 114 accesses IPTV system 100 via access network 192 using information received from client gateway 147. Access network 192 provides security for private network 194. Client equipment 110 accesses client gateway 147 via access network 192, and client gateway 147 allows client equipment 110 to access private network 194 once client equipment 110 is authenticated or verified. Similarly, client gateway 147 prevents unauthorized client equipment (not illustrated), such as hacker computers or stolen set-top box devices, from accessing private network 194 by denying access to these devices beyond access network 192.

For example, when set-top box device 114 accesses IPTV system 100 via access network 192, client gateway 147 verifies subscriber information by communicating with subscriber and system store 145 via private network 194, APP switch 140, and APP switch 141. Further, client gateway 147 verifies billing information and status by communicating with OSS/BSS gateway 144 via private network 194 and APP switch 140. OSS/BSS gateway 144 transmits a query across APP switch 140, to APP switch 141, and APP switch 141 communicates the query across public network 196 to an OSS/BSS server 164 (described below). After the client gateway 147 confirms subscriber and/or billing information, client gateway 147 allows set-top box device 114 access to IPTV system 100 content and VOD server 136 content. If client gateway 147 cannot verify subscriber information for set-top box 114, such as when set-top box 114 is connected to a different twisted pair, or when set-top box 114 is stolen, client gateway 147 denies transmissions to and from set-top box device 114 beyond access network 192.

Domain controller 146 communicates with public network 196 via APP switch 141. Domain controller 146 includes a web portal that allows a subscriber to access IPTV system 100 using a personal computer 198. Domain controller 146 also communicates with a data network 172 that is connected to a wireless access point 174. Wireless access point 174 communicates with a subscriber's wireless device 176 to provide wireless access to IPTV system 100. A non-limiting example of a wireless device 176 includes a cellular telephone, a personal digital assistant, a mobile e-mail device, a portable digital video device, another wireless device, or any combination thereof. Wireless device 176 includes a display device 178 for displaying information from IPTV system 100. Display device 178 includes a text display, a picture display, a video display or any combination thereof.

Acquisition tier 106 includes an acquisition tier (AQT) switch 150, a live acquisition server 152, a broadcast service 154, and a video-on-demand importer server 156. AQT switch 150 manages communication with CF tier 104 and application tier 104 through private network 194, and with application tier 104 and OM tier 108 through public network 196. AQT switch 150 is coupled to live acquisition server 152, and video-on-demand importer server 156. Live acquisition server 152 acquires television content from broadcast service 154. Live acquisition server 152 sends the television content to AQT switch 150 for transmission to CF tier 102 via private network 194. The television content is further encoded at data server 132, and sent to client equipment 110 via access network 192. Set-top box 114 receives the television content from modem 112, decodes the television content, and transmits the information to display device 116 according to commands from remote control device 120.

Additionally, VOD importer server 156 receives content from one or more video-on-demand sources that are outside IPTV system 100, such as movie studios and programmers of non-live content. VOD importer server 156 transmits the video-on-demand content to AQT switch 150, and AQT switch 150 communicates the material to CFT switch 130 via private network 194. The video-on-demand content is stored on VOD server 136. When a subscriber issues a request for VOD content to set-top box 114 through remote control 118, the request is transmitted over access network 192 to VOD server 136 via CFT switch 130. Upon receiving such a request, VOD server 136 retrieves the requested VOD content and transmits the content to set-top box or 114 across access network 192 via CFT switch 130.

OM tier 108 includes an OM tier (OMT) switch 160, a TV2 server 162, the OSS/BSS server 164, and a simple network management protocol (SNMP) monitor server 166. OMT switch 160 manages the communication between OM tier 108 and public network 196. OMT switch 160 is coupled to TV2 server 162, OSS/BSS server 164, and SNMP monitor server 166 that monitors network devices. TV2 server 162 receives television content from live acquisition server 152, or video-on-demand content from VOD importer server 156 through public network 196. The television and video-on-demand content is sent by TV2 server 162 to OMT switch 160 and forwarded to a subscriber of IPTV system 100 who accesses public network 196 through personal computer 198.

Figure 2:
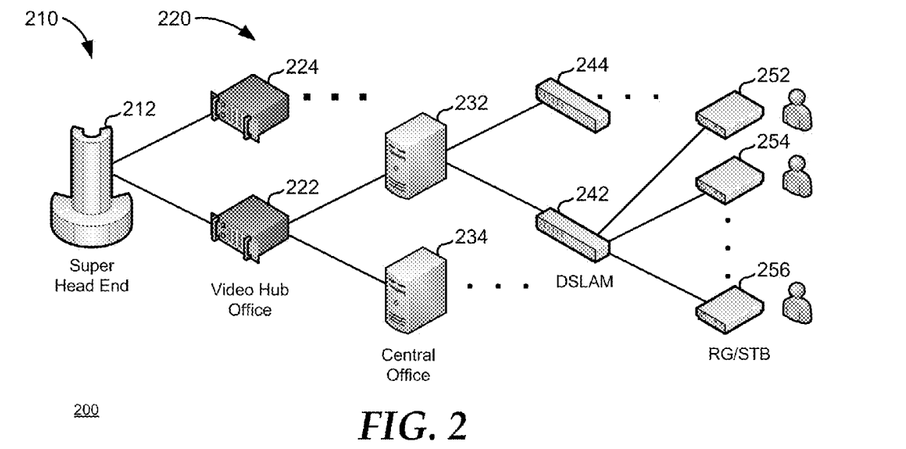
FIG. 2 is a block diagram of an embodiment of a layered IPTV system.

FIG. 2 illustrates an embodiment of a layered IPTV system 200, similar to IPTV system 100, that includes a national level 210, and a regional level 220. IPTV system 200 provides fiber-to-the-neighborhood (FTTN) and fiber-to-the-home (FTTH) access to IPTV services including on-demand and real-time content streaming. National level 210 includes a super head office (SHO) server 212 that functions to receive and store content for distribution to within IPTV system 200, and handles national level content management. SHE server 212 functions to prepare content for distribution, as for example by converting content received in an analog stream into a codec suitable for distribution via IPTV, and to manage digital rights to the content for IPTV system 200. SHE server 212 distributes copies of the content to one or more regions in regional level 220. The content provided by IPTV system 200 can include real-time or on-demand television programming, on-demand movie or event content, audio content, web content, or other forms of content. In a particular embodiment, SHE server 212 is similar to acquisition tier 106 in IPTV system 100.

Regional level 220 includes one or more video hub office (VHO) servers 222 and 224. VHO servers 222 and 224 are placed in key locations to provide regional storage and distribution of the content received from SHO server 212. Thus, for example, a large metropolitan area can be served by VHO server 222, and a different metropolitan area can be served by VHO 224. VHO servers 222 and 224 pass through the real-time content and store the on-demand content received from SHE server 212. VHO servers 222 and 224 receive user requests for real-time content and satisfy these requests by passing through the requested real-time content to the requesting users. VHO servers 222 and 224 also receive user requests for on-demand content, and satisfy these requests by streaming the requested on-demand content to the requesting users. If the requested content is not stored on VHO servers 222 and 224, VHO servers 222 and 224 will request the content from SHE server 212. In a particular embodiment, VHO servers 222 and 224 are similar to VOD server 136 in IPTV system 100.

Regional level 220 also includes several levels of successively more local distribution. Thus, the metropolitan area served by VHO server 222 includes one or more central office servers 232 and 234, and the metropolitan area serve by VHO server 224 includes one or more central office servers (not illustrated). Central office servers 232 and 234 are placed in locations to provide area wide distribution of the content received from VHO server 222. Thus, for example, central office 232 can distribute content to the north side of the metropolitan area, and central office 234 can distribute content to the south side of the metropolitan area. Next, the local area served by central office 232 includes one or more digital subscriber line access multiplexers (DSLAMs) 242 and 244, and the local area served by central office 234 includes one or more DSLAMs (not illustrated). DSLAMs 242 and 244 are placed in locations to provide local distribution of the content received from central office 232. For example, DSLAMs 242 and 244 can each distribute content to different neighborhoods in the north side of the metropolitan area served by VHO server 222. DSLAM 242 functions to provide twisted-pair copper wire digital subscriber line (DSL) service to one or more local residential gateways or STBs (RG/STB) 252, 254, and 256, and DSLAM 244 functions to provide twisted-pair copper wire DSL service to one or more local RG/STBs (not illustrated). DSLAMs 242 and 244 typically provide DSL service to up to 192 subscribers.

Channel content in IPTV system 200 is managed at regional level 220, such that VHO 222 maintains a set of channel maps for the metropolitan area served by VHO 222, and VHO 224 maintains a set of channel maps for the metropolitan area served by VHO 224. The channel maps provide for the routing of various content to RG/STBs 252, 254, and 256, such that the respective subscribers, by tuning their RG/STBs 252, 254, and 256 to a particular channel, receive the content associated with that channel in the channel map. In a particular embodiment, IPTV system 200 uses Microsoft IPTV Mediaroom to implement the channel maps. A channel map can include a listing of channels sourced by VHO 222 and VHO 224 and channel implementation information associated with each channel. The channel implementation information can include a channel type, a subscription level under which the associated channel is viewed, various service related information as described below, port access and IP address information, or other information related to delivery of IPTV content.

Table 1 illustrates an exemplary embodiment of a channel map for VHO 222. The channel map illustrates the channel numbers that are available to the subscribers in the first column labeled "Channel". The channels are divided into segments, such that the channels under the row labeled "Local Channels," channels 1-99, provide access to content that is more local in nature, the channels under the row labeled "Premium Channels," channels 100-199, provide access to premium content, and the channels under the row labeled "Pay-Per-View Channels," channels 200 and above, provide access to VOD content. Other exemplary channel segments include music channels, application channels, news channels, foreign language channels, other types of channels, or a combination thereof. In the illustrated embodiment, each channel is associated with one or more channel type, as illustrated in the column labeled "Type," one or more subscription level, as illustrated in the column labeled "Level," and one or more service collection, as illustrated in the column labeled "Service Collection". Each service collection includes one or more services, illustrated in the column labeled "Service," with an associated Internet protocol (IP) address, illustrated in the column labeled "IP Address".

TABLE 1

Example Channel Map

| Channel | Type | Level | Service Collection | Service | IP Address |
|---|---|---|---|---|---|
| Local Channels | | | | | |
| 1 | Network Channel | Basic Service | WABS - Local WOLF Affiliate Collection | Primary Stream P-in-P Stream | 123.456.789.003 123.456.789.004 |
| ... | | | | | |
| Premium Channels | | | | | |
| 100 | Advertise | Basic Service | HBO Advertisement | Subscribe Image | 123.456.987.001 |
| 100 | Premium Channel | Extended Service | HBO - Main Event Collection | Primary Stream P-in-P Stream | 123.456.879.001 123.456.879.002 |

TABLE 1-continued

Example Channel Map

| Channel | Type | Level | Service Collection | Service | IP Address |
|---|---|---|---|---|---|
| ... | | | | | |
| | | | Pay-Per-View Channels | | |
| 200 | Advertise | Basic Service | Purchase Pay-Per-View Event Collection | Schedule Image<br>PPV Ad Stream | 123.456.987.003<br>123.456.987.004 |
| 200 | Pay-Per-View Channel | Pay-Per-View (Purchased) | Pay-Per-View Event Purchased Collection | Primary Stream<br>P-in-P Stream<br>Metadata Stream | 123.456.879.003<br>123.456.879.004<br>123.456.879.005 |
| ... | | | | | |

In the illustrated embodiment, a set-top box receives the channel map, and provides the subscriber with access to the service collections associated with the subscriber's subscription level. Thus, a subscriber with a "Basic Service" level will view content from a network on channel 1, and advertisements for a premium channel on channel 100 and for a pay-per-view channel on channel 200, and a subscriber with an "Extended Service" level will view content from the premium channel on channel 100 in the place of the advertisement for the premium channel. A subscriber can also purchase pay-per-view content to obtain a "Pay-Per-View (Purchased)" level to view the pay-per-view content, in the place of the advertisement for the pay-per-view channel.

The service collections define the types of content streams available on the associated channels and include one or more services. Where a service collection includes a single service, then the content available from the associated IP address is the only channel content that will be displayed on the associated channel. For example, for basic service subscribers, channel 100 will use the "HBO Advertisement" service collection that accesses a "Subscribe Image" service from IP address 123.456.987.001. This image can provide information whereby the subscriber can obtain extended service, to view the content from HBO. Other non-limiting examples where a service collection may have a single service include a directory stream for a directory channel, a default stream for an unused channel, other channels with a single stream or image, or a combination thereof.

Where a service collection includes more than one service, the services can be accessed separately to provide similar content. For example, for extended service subscribers, channel 100 will use the "HBO—Main Event Collection" service collection that accesses the "Primary Stream" service from IP address 123.456.879.001 for a full resolution stream of content from HBO that is viewed when the set-top box is tuned to channel 100, and that accesses the "P-in-P Stream" service from IP address 123.456.879.002 for a low resolution stream of the content that is viewed when the set-top box is tuned to provide channel 100 in a picture-in-picture box. Services can also be accessed together and the steams combined to provide a single channel content. For example, for basic service subscribers, channel 200 will use the "Purchase Pay-Per-View Event Collection" service collection that accesses the "Schedule Image" service from IP address 123.456.987.003 that provides an updated schedule of events available on VOD channels, together with the "PPV Ad Stream" service from IP address 123.456.987.004 that provides a stream of content item trailers to advertise current offerings of the VOD system. Service collections can also function in a combination of the above ways. For example, where pay-per-view content is purchased, channel 200 will use the "Pay-Per-View Event Purchased" service collection that accesses the "Primary Stream" service from IP address 123.456.879.003 for a full resolution stream of the VOD content, and that accesses the "P-in-P Stream" service from IP address 123.456.879.004 for the low resolution picture-in-picture stream. In addition, the "Pay-Per-View Event Purchased" service collection includes a "Metadata Stream" service with content that can be viewed while watching either the Primary Stream or the P-in-P Stream.

In another embodiment (not illustrated), VHOs 222 and 224 maintain multiple channel maps for the differing subscription levels. In this embodiment, each channel is associated with only one service collection, and distinguishing between the subscription levels is performed based upon which channel map is sent to a particular set-top box. Further, every time a particular subscriber's subscription level changes, the subscriber's set-top box is provided with an updated channel map, or portion thereof. For example, if a subscriber purchases VOD content, an updated channel map will reflect that fact, thus permitting the subscriber to view the purchased VOD content. In a particular embodiment, VHOs 222 and 224 maintain a unique channel map for each subscriber. Thus, in these embodiments, VHOs 222 and 224 will create, delete, or change channel maps often, to reflect the day-to-day changes in the subscriber base.

In addition, VHOs 222 and 224 will change channel maps to meet changing conditions within IPTV system 200, including addition, deletion, or moving of channels in the channel map. For example, Table 2 illustrates moving the network affiliated content from channel 1 to channel 2, and adding a directory content service on channel 1. Service collections can also be added, deleted, or modified, as illustrated in Table 3, where the picture-in-picture for channel 1 is deleted from the directory content service. Services can also be added, deleted or modified to associate with different IP addresses. Changes within IPTV system 200 include local changes that affect a single VHO 222 or 224, and global changes that affect all VHOs 222 and 224. A non-example of a global change includes adding, deleting, or changing premium channels, VOD content channels, other content channels that are globally organized within IPTV system 200, or a combination thereof.

TABLE 2

Changing the Channel Map

| Channel | Type | Level | Service Collection | Service | IP Address |
|---|---|---|---|---|---|
| | | | Local Channels | | |
| 1 | Directory Channel | Basic Service | VHO 222 Directory Collection | Primary Stream<br>P-in-P Stream | 123.456.789.001<br>123.456.789.002 |
| 2 | Network Channel | Basic Service | WABS - Local WOLF Affiliate Collection | Primary Stream<br>P-in-P Stream | 123.456.789.003<br>123.456.789.004 |

TABLE 3

Changing a Service Collection

| Channel | Type | Level | Service Collection | Service | IP Address |
|---|---|---|---|---|---|
| | | | Local Channels | | |
| 1 | Directory Channel | Basic Service | VHO 222 Directory Collection | Primary Stream | 123.456.789.001 |
| 2 | Network Channel | Basic Service | WABS - Local WOLF Affiliate Collection | Primary Stream<br>P-in-P Stream | 123.456.789.003<br>123.456.789.004 |

Figure 3:
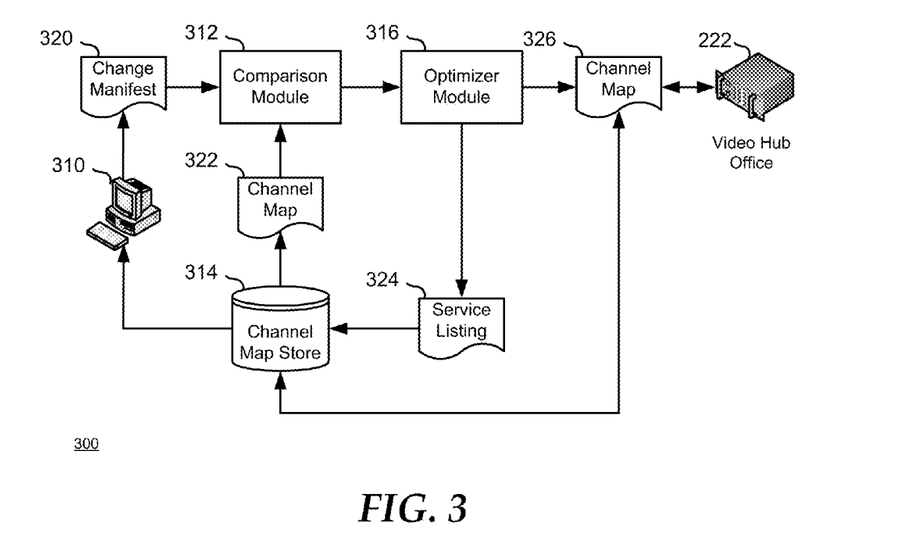
FIG. 3 is an illustration of an embodiment of a service management system.

FIG. 3 illustrates an embodiment of a service management system 300, including a management station 310, a comparison module 312, a channel map storage module 314, and an optimizer module 316. Management station 310 includes an input and an output. Comparison module 312 includes a first input connected to the output of management station 310, a second input, and an output. Channel map storage module 314 includes an input, a first output connected to the input of management station 314, a second output connected to the second input of comparison module 312, and an input/output port. Optimizer module 316 includes an input connected to the output of comparison module 312, a first output connected to the input/output port of channel map storage module 314, and a second output connected to the input of channel map storage module 314. VHO 222 is connected to the input/output port of channel map storage module 314 and to the first output of optimizer module 316. Management station 310, comparison module 312, channel map storage module 314, optimizer module 316, and VHO 222 can be implemented in hardware, software, or any combination thereof. Each module may include one or more computer systems. When a module includes more than one computer system, the functions of the module can be distributed across the multiple computer systems in a symmetric manner where each computer system performs the same type of tasks, or in an asymmetric manner where two computer systems of the module perform different tasks.

In operation, service management system 300 functions to automate the creation, modification, and implementation of services, service collections and channel maps in VOH 222. Management station 310 provides an environment where a technician (not illustrated) can define new services, service collections, and channel maps, or can modify or delete the same. As such, management station 310 can retrieve a channel map template (not illustrated) from channel map storage module 314 to use as a basis upon which to define the new services, service collections, or channel maps. Management station 310 can also retrieve an existing channel map from channel map storage module 314 for modification, or can direct channel map storage module 314 to delete an existing channel map.

Management station 310 takes the definitions and changes to services, service collections and channel maps and generates a change manifest 320. In a particular embodiment, change manifest 320 defines a complete set of the channels of IPTV system 200, and the associated service collections and services. For example, change manifest 320 provides a proposal for the complete channel map, including all channels and their associated service collections and services for VHO 222. In another embodiment, change manifest 320 defines the complete set of channels in terms of the changes to the channel map. For example, change manifest 320 can include all channels and the associated service collections and services that are changed, and an indication that the affected channels are to remain unchanged. In yet another embodiment, change manifest 320 provides the subset of the channel map that includes only the channels that are to be changed. Change manifest 320 can be implemented as a spreadsheet or database, utilizing a commercially available spreadsheet or database program, as a proprietary listing associated with service management system 300, as another type of listing or table, or a combination thereof. In a particular embodiment, management station 300 includes a graphical user interface (not illustrated) with which the technician creates change manifest 320 and manages the operations of service management system 300, as described below.

Comparison module 312 functions to receive change manifest 320, retrieve a selected channel map 322 from channel map storage module 314, and compare change manifest 320 to channel map 322. Comparison module 312 outputs the differences to optimizer module 316. In the embodiment where change manifest 320 provides the subset of the channel map that includes only the channels that are to be changed, comparison module 312 is an optional element of service management system 300, since change manifest 320 includes similar information to the differences outputted to optimizer module 316.

Optimizer module 316 functions to evaluate the differences provided by comparison module 312, applying various channel map, service collection, and service rules and optimizations to the differences, and creating a revised channel map 326. The rules applied can relate to channel placement, channel types, service collections, services, and other channel implementation information, and can include restrictions, recommendations, or best practices. For example, IPTV system 200 may define that music content be placed on channels 400 to 499. If the differences provided by comparison module 312 include placing music content on channel 275, then optimizer module 316 can flag the problem so that the technician can change the channel association for the music content. In an alternative embodiment, optimizer module 316 can optimize the differences to change the channel association for the music content to an available channel in the permitted range. Other optimizations can include determining if service collections or services in change manifest 320 are copies of existing service collections of services, and substituting the existing service collections or services into the revised channel map 326. Optimizer module 316 provides revised channel map 326 to VHO 222 and to channel map storage module 314. Optimizer module 316 also determines if new service collections or services are necessary to implement the revised channel map, or if existing service collections or services need to be modified. If so, optimizer module 316 outputs a service listing 324, including the new or modified service collections or services to channel map storage module 314. In a particular embodiment (not illustrated), content stream services and image services are managed separately in service management system 300, and thus optimizer module 316 outputs separate service listing for content services and image services.

Note that in the illustrated embodiment, service management system 300 provides the management functions described above for all services, image services, service collections, and service deployments used in VHO 222. In another embodiment (not illustrated), separate service management systems that are similar to service management system 300 provide the management functions described above, but with each service management systems providing the management functions for one or more of services, image services, service collections, and service deployments.

In a particular embodiment (not illustrated), in addition to channel maps maintained in VHOs 222 and 224, a channel map is maintained in SHO 212. In this embodiment, changes that are local in extent, effecting only the local VHO 222 or 224 channel map, are managed by a local service management system similar to service management system 300, and national changes that effect all of IPTV system 200 are managed by a nation service management system similar to service management system 300, except that the national service management system is connected to SHO 212. In this embodiment, the national service management system maintains the portions of the channel map that are common to all VHOs 222 and 224, and the local service management systems maintain the portions of the channel map that are specific to each VHO 222 or 224. In another embodiment, the national service management system can also maintain the local portions of the channel map for VHOs 222 and 224. Here, VHOs 222 and 224 can export the local portions of the channel map to the national service management system, and can import revised local portions of the channel map to implement the local changes.

Figure 4:
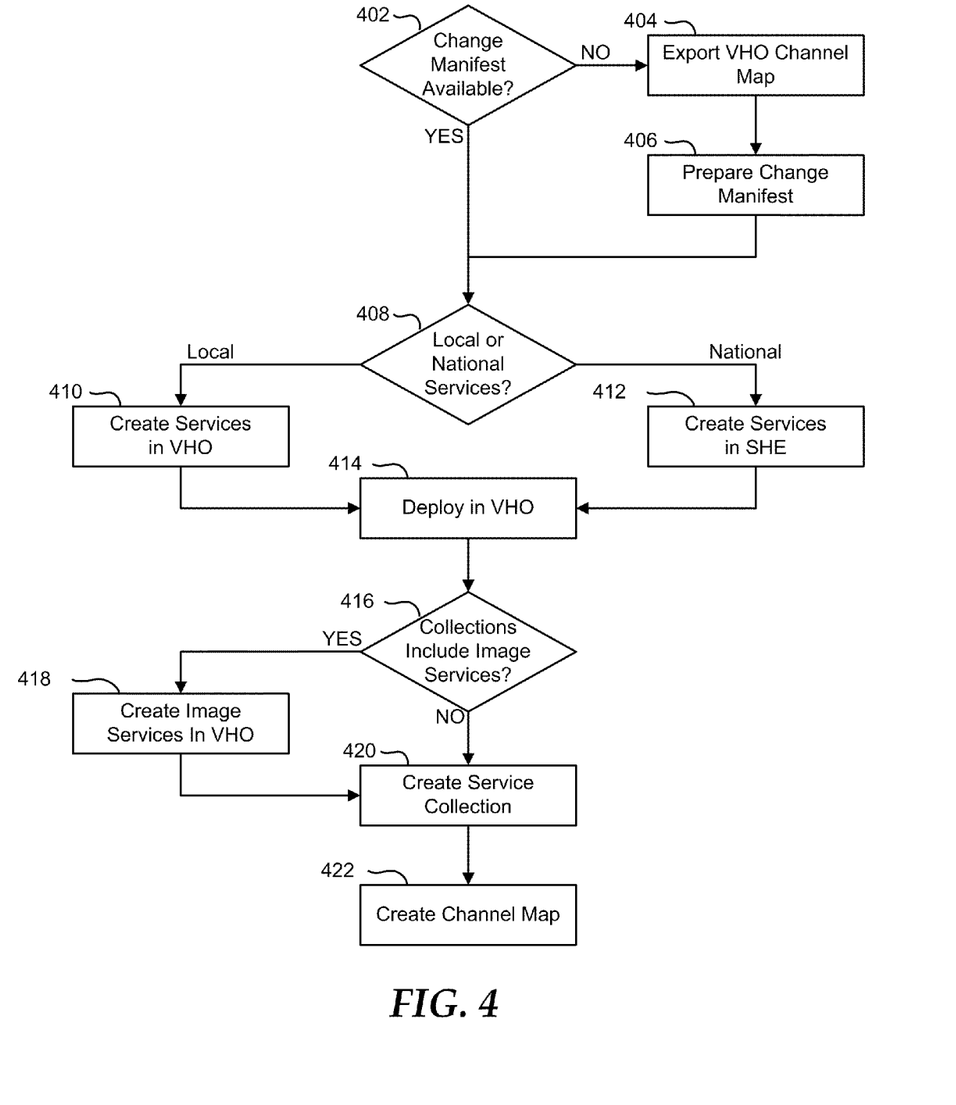
FIG. 4 is a flowchart illustrating an embodiment of a method for managing services on an IPTV system.

FIG. 4 is a flowchart illustrating an embodiment of a method for managing services on an IPTV system. The method starts in block 402 where a decision is made as to whether or not a change manifest is available. For example, a technician may create change manifest 320 on management station 310. If not, the "NO" branch of decision block 402 is taken, and a VHO channel map is exported in block 404. Thus, a channel map or channel map template can be retrieved from channel map storage module 314 to management station 310. A change manifest is prepared in block 406. Here, the technician can create a change manifest on management station 310. After the change manifest is prepared, or if a change is available, and the "YES" branch of decision block 402 is taken, then a decision is made as to whether the changes involve local services or national services in decision block 408. If the changes involve local services, then the "Local" branch of decision block 408 is taken, the services defined in the change manifest are created in the local VHO in block 410, and the resulting services are deployed in the local VHO in block 414. If the changes involve national services, then the "National" branch of decision block 408 is taken, the services defined in the change manifest are created in the SHO in block 412, and the resulting services are deployed in each local VHO in block 414.

A decision is made as to whether the service collections include image services in decision block 416. If so, then the "YES" branch of decision block 416 is taken and the image services defined in the change manifest are created in the local VHO in block 418. After the image services are created in block 418, or if the service collections do not include image services and the "NO" branch of decision block 416 is taken, then the service collections are created in block 420, and the revised channel map is created in block 422.

Figure 5:
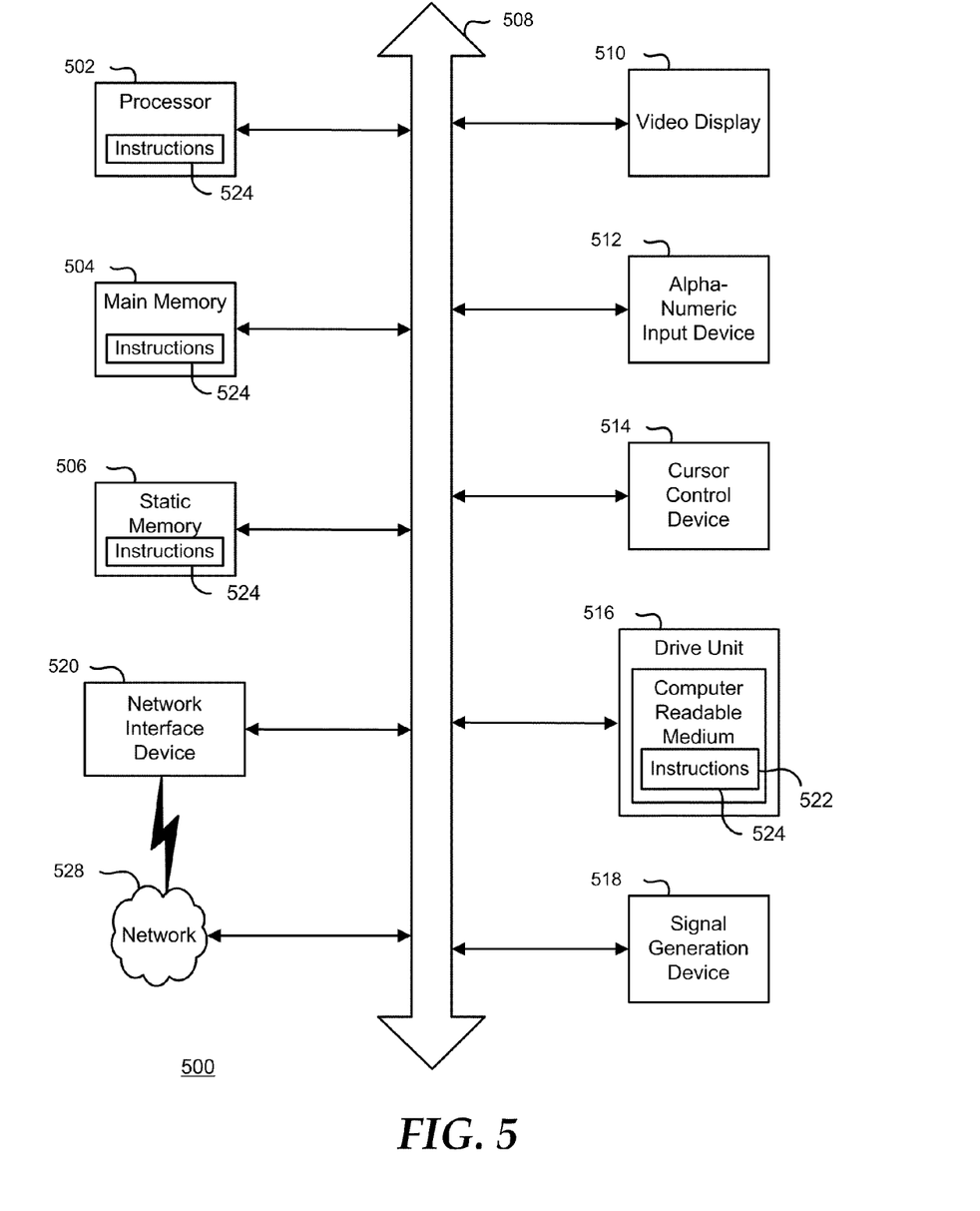
FIG. 5 is a block diagram showing an illustrative embodiment of a general computer system.

FIG. 5 shows an illustrative embodiment of a general computer system 500 in accordance with at least one embodiment of the present disclosure. Computer system 500 includes a set of instructions that can be executed to cause computer system 500 to perform any one or more of the methods or computer based functions disclosed herein. Computer system 500 can operate as a standalone device or can be connected via a network to other computer systems or peripheral devices.

In a networked deployment, computer system 500 operates in the capacity of a server or as a client computer in a server-client network environment, or as a peer computer system in a peer-to-peer (or distributed) network environment. Computer system 500 can also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, computer system 500 is implemented using electronic devices that provide voice, video or data communication. Further, while computer system 500 is illustrated as a single system, the term "system" shall also be taken to include any collection of systems or sub-systems that individually or jointly execute a set, or multiple sets, of instructions to perform one or more computer functions.

Computer system 500 includes a processor 502 such as a central processing unit (CPU), a graphics processing unit (GPU), or both. Moreover, computer system 500 includes a main memory 504 and a static memory 506 that communicate with each other via a bus 508. Computer system 500 further includes a video display unit 510, such as a liquid crystal display (LCD), an organic light emitting diode (OLED), a flat panel display, a solid state display, or a cathode ray tube (CRT). Additionally, computer system 500 includes an input device 512, such as a keyboard, and a cursor control device 514, such as a mouse. Computer system 500 also includes a disk drive unit 516, a signal generation device 518, such as a speaker or remote control, and a network interface device 520.

In a particular embodiment, disk drive unit 516 includes a computer-readable medium 522 in which one or more sets of instructions 524 are embedded. Instructions 524 embody one or more of the methods or logic as described herein. In a particular embodiment, instructions 524 reside completely, or at least partially, within main memory 504, static memory 506, and/or within processor 502 during execution by computer system 500. Main memory 504 and processor 502 also include computer-readable media. Network interface device 520 provides connectivity to a network 526 such as a wide area network (WAN), a local area network (LAN), or other network. The present disclosure contemplates a computer-readable medium that includes instructions 524 or receives and executes instructions 524 responsive to a propagated signal, so that a device connected to network 526 can communicate voice, video or data over network 526. Further, instructions 524 can be transmitted or received by network 526 via network interface device 520.

In an alternative embodiment, dedicated hardware implementations such as application specific integrated circuits, programmable logic arrays and other hardware devices can be constructed to implement one or more of the methods described herein. Applications that include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein can be implemented by software code executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A service management server, comprising:
a memory to store computer instructions; and
a processor coupled to the memory, wherein the processor, responsive to executing the computer instructions, performs operations comprising:
comparing a first internet protocol television channel map and a change manifest to generate a first list of differences between the first internet protocol television channel map and the change manifest, wherein the first internet protocol television channel map associates a plurality of channels of an internet protocol television system with a first plurality of services;
determining a second plurality of services to implement the change manifest based on the first list of differences;
modifying the first plurality of services according to the second plurality of services to generate a modified plurality of services;
applying a plurality of rules to the first list of differences and the modified plurality of services to generate a second internet protocol television channel map, wherein the second internet protocol television channel map associates the plurality of channels with the modified plurality of services; and storing the second internet protocol television channel map.

2. The service management server of claim 1, wherein the rules comprise one of channel placement rules, channel type rules, restriction rules, and practices rules.

3. The service management server of claim 1, wherein the processor further performs operations comprising receiving the first internet protocol television channel map.

4. The service management server of claim 1, wherein the change manifest is based upon the first internet protocol television channel map.

5. The service management server of claim 1, wherein the change manifest comprises a third internet protocol television channel map.

6. The service management server of claim 1, wherein the second internet protocol television channel map is provided to an internet protocol television hub office operable to implement the second internet protocol television channel map within a portion of the internet protocol television system.

7. The service management server of claim 1, wherein the second plurality of services comprises a first service not included in the first plurality of services.

8. The service management server of claim 1, wherein the second plurality of services comprises a first service included in the first plurality of services that is changed.

9. A method, comprising:
- comparing, by a system comprising a processor, a first internet protocol television channel map and a change manifest to generate a first list of differences between the first internet protocol television channel map and the change manifest, wherein the first internet protocol television channel map is operable to associate a plurality of channels in an internet protocol television system with a first plurality of services;
- evaluating, by the system, the first list of differences to generate a second plurality of services to implement the change manifest;
- modifying, by the system, the first plurality of services according to the second plurality of services to generate a modified plurality of services;
- applying, by the system, a plurality of rules to the first list of differences and the modified plurality of services to generate a second internet protocol television channel map, wherein the second internet protocol television channel map associates the plurality of channels with the modified plurality of services; and
- storing, by the system, the second internet protocol television channel map.

10. The method of claim 9, further comprising providing, by the system, the change manifest to a management station.

11. The method of claim 10, further comprising receiving, by the system, from the management station the first internet protocol television channel map.

12. The method of claim 11, wherein the change manifest is based upon the first internet protocol television channel map.

13. The method of claim 12, wherein the change manifest comprises a third internet protocol television channel map.

14. The method of claim 9, further comprising providing, by the system, the second internet protocol television channel map to an internet protocol television hub office operable to implement the second internet protocol television channel map within a geographic area of the internet protocol television system served by the internet protocol television hub office.

15. The method of claim 9, wherein the second plurality of services comprises a service not included in the first plurality of services.

16. The method of claim 9, wherein the second plurality of services comprises a first service included in the first plurality of services that is changed.

17. A computer-readable storage device, comprising computer instructions which, responsive to being executed by a processor, cause the processor to performing operations comprising:
- comparing a first internet protocol television channel map and a change manifest to generate a first list of differences between the first internet protocol television channel map and the change manifest, wherein the first internet protocol television channel map is operable to associate a plurality of channels in an internet protocol television system with a first plurality of services;
- evaluating the first list of differences to generate a second plurality of services to implement the change manifest;
- modifying the first plurality of services according to the second plurality of services to generate a modified plurality of services;
- applying a plurality of rules to the first list of differences and the modified plurality of services to generate a second internet protocol television channel map, wherein the second internet protocol television channel map associates the plurality of channels with the modified plurality of services; and
- storing the second internet protocol television channel map.

18. The computer-readable storage device of claim 17, comprising computer instructions which when executed by the processor, cause the processor to perform operations comprising:
- receiving from a management station the first internet protocol television channel map; and
- providing the change manifest to the management station.

19. The computer-readable storage device of claim 18, wherein the change manifest is based upon the first internet protocol television channel map.

20. The computer-readable storage device of claim 17, comprising computer instructions which when executed by the processor, cause the processor to perform operations comprising providing the second internet protocol television channel map to an internet protocol television hub office operable to implement the second internet protocol television channel map within a portion of the internet protocol television system served by the internet protocol television hub office.

* * * * *